(12) United States Patent
Hale

(10) Patent No.: US 11,103,331 B2
(45) Date of Patent: Aug. 31, 2021

(54) CONVERTIBLE DENTAL ASSEMBLY

(71) Applicant: Kyle Hale, League City, TX (US)

(72) Inventor: Kyle Hale, League City, TX (US)

( * ) Notice: Subject to any disclaimer, the term of this patent is extended or adjusted under 35 U.S.C. 154(b) by 419 days.

(21) Appl. No.: 16/087,489

(22) PCT Filed: Oct. 17, 2017

(86) PCT No.: PCT/US2017/056893
§ 371 (c)(1),
(2) Date: Sep. 21, 2018

(87) PCT Pub. No.: WO2019/078818
PCT Pub. Date: Apr. 25, 2019

(65) Prior Publication Data
US 2020/0383757 A1 Dec. 10, 2020

(51) Int. Cl.
*A61C 8/00* (2006.01)
(52) U.S. Cl.
CPC ............ *A61C 8/008* (2013.01); *A61C 8/0056* (2013.01); *A61C 8/0062* (2013.01);
(Continued)
(58) Field of Classification Search
CPC ..... A61C 8/008; A61C 8/0062; A61C 8/0063; A61C 8/0068; A61C 8/0069;
(Continued)

(56) References Cited

U.S. PATENT DOCUMENTS 5,100,323 A * 3/1992 Friedman ............. A61C 8/0018
433/173
6,981,871 B2 * 1/2006 Mullaly ............... A61C 8/0048
433/172

(Continued)

OTHER PUBLICATIONS

International Search Report and Written Opinion dated Jul. 11, 2018 for related PCT app. No. PCT/US2017/056893.

*Primary Examiner* — Jacqueline T Johanas
*Assistant Examiner* — Daniel Philip Bissette
(74) *Attorney, Agent, or Firm* — D'Ambrosio & Menon, P.L.L.C.; Usha Menon

(57) ABSTRACT

A convertible dental assembly is disclosed herein. The convertible dental assembly includes abutments adapted for fixing with implants; fixed-hybrid housings adapted for fixing with the abutments through a fixing screw; and removable-hybrid housings, adapted for engagement with abutments through snap fit parts. The fixing screw and the snap fit part are fixed to the abutments through same female threads on the abutments. The fixed-hybrid housings are used for a fixed-hybrid dental assembly during period of healing of the implants, and replaced by the plurality of removable-hybrid housings along with the snap fit parts for a removable-hybrid dental assembly after the period of healing of the implants. The fixed-hybrid housings and the removable-hybrid housings can be captured in the dental assembly via chair-side pickup at respective instances. The removable-hybrid housings can be placed indirectly by a dental laboratory if a new denture is being fabricated. The abutment includes an outer frustoconical profile that engages with matching frustoconical cavities in the fixed-hybrid housings and removable-hybrid housings.

10 Claims, 7 Drawing Sheets

(52) U.S. Cl.
CPC .......... *A61C 8/0068* (2013.01); *A61C 8/0069* (2013.01); *A61C 8/0074* (2013.01)

(58) Field of Classification Search
CPC ... A61C 8/0074; A61C 8/0075; A61C 8/0081; A61C 8/0093; A61C 8/0095; A61C 8/0098; A61C 8/0048; A61C 8/005; A61C 8/0056
See application file for complete search history.

(56) References Cited

U.S. PATENT DOCUMENTS

| | | | |
|---|---|---|---|
| 9,033,709 B1 * | 5/2015 | Allen | A61C 8/0062 433/173 |
| 9,517,114 B2 * | 12/2016 | Mullaly | A61C 13/2656 |
| 2002/0106610 A1 * | 8/2002 | Hurson | A61C 8/008 433/173 |
| 2009/0246733 A1 | 10/2009 | Auderset et al. | |
| 2011/0269105 A1 * | 11/2011 | Jahn | A61C 8/0056 433/174 |
| 2017/0049540 A1 | 2/2017 | Mullaly | |

* cited by examiner

CONVERTIBLE DENTAL ASSEMBLY

CROSS REFERENCE TO RELATED APPLICATION(S)

This application is a U.S. National stage entry under 35 U.S.C. 371 of PCT/US2017/056893 filed Oct. 17, 2017 and designating the United States, the disclosure(s) of which is (are) expressly incorporated by reference herein.

FIELD OF INVENTION

The present disclosure relates generally to the field of dental prosthesis. In particular, it pertains to a method and device for preparing a dental prosthesis that allows a patient to have a fixed hybrid denture during healing, and its conversion to a removable hybrid denture after the healing period.

BACKGROUND

The background description includes information that may be useful in understanding the present invention. It is not an admission that any of the information provided herein is prior art or relevant to the presently claimed invention, or that any publication specifically or implicitly referenced is prior art.

Dental prostheses are well known in related art. They are provided to treat edentulous patients or patients with absent or missing teeth. The oldest dental prosthesis is a conventional removable denture. The conventional denture is unsecured and relies on soft tissue for support and retention. In most cases, some type of denture adhesive is used to aid in retention. Wearing unsecured dentures can be painful, inconvenient and awkward. Such dentures can make it difficult to chew a variety of foods. This can cause a user/wearer/patient to stop eating many of the foods he or she once enjoyed. Wearing them may also affect how the user pronounces words, and therefore, the way the person speaks. Besides, being unsecured, there is an underlying risk that the denture can come out when the wearer coughs, laughs, or sneezes.

The above stated drawbacks of conventional dentures have been overcome by implant supported or implant retained dentures. These are also known as implant overdentures or fixed-hybrid dentures. With the advent of dental implants, the treatment options are wide-ranging and dependent mainly on the user's budget and his available underlying bone. Dental implants provide patients with restorative options for the edentulous maxilla (upper jaw) and mandible (lower jaw). Using implants, either fixed or removable prostheses can be attached to the edentulous maxilla or mandible.

With any full arch dental prosthesis, sometimes referred to as restoration, whether fixed or removable, there are three major components: the implant(s), the prosthesis, and connection of the prosthesis to the implant. The connection of the prosthesis to the implant may take different configurations depending on the type of prosthesis. In general, it comprises an abutment that is fixed to the implant through an implant-abutment connection. The prosthesis to the implant connection comprises further parts that enable connection between the prosthesis and the abutment, i.e. abutment-prosthesis connection, and they can vary depending on type of prosthesis, i.e. fixed or removable.

FIG. 1 illustrates a typical fixed-hybrid dental prosthesis attached to edentulous mandible through four implants. Shown therein are implants 102 that are fixed and osseointegrated in the edentulous mandible 104, and abutments 106 that are fixed to the implants 102 through abutment to implant connections that employ abutment screws 108. Also shown are fixing screws 110 that permanently (i.e., not removable by the wearer) hold the denture 112 to the abutment 106, therefore securing the denture to the jaw 104.

While the exemplary illustration of FIG. 1 of a conventional fixed-hybrid dental prosthesis shows one type of connections between hybrid prosthesis and implants, various other types of connections that facilitate connection of the prosthesis to the implants are known in the art.

U.S. Pat. No. 6,200,345 B1 discloses a type of connection between two parts where one part is implanted into a patient bone. Thus, the patent reference provides an implant-abutment connection.

United States Patent Application No. 2016/0120627 discloses a dental implant with a frustoconical outer profile with an increasing section from the upper end, and a frustoconical inner profile, with a decreasing section from the upper end; a middle section for coupling an actuating tool and also for inserting a prosthetic attachment, and a lower threaded section suitable to receive an anchor screw of a dental prosthesis. As can be seen, it discloses features for implant-abutment connection.

U.S. Pat. No. 5,368,483 discloses a device for fixing a dental prosthesis having a base, which can be inserted into a jaw bone, an abutment and a shell. The base has a hole with a mouth at its end face, with an internal thread and with an extension, and a conical annular surface enclosing the mouth of the hole. The abutment has a thread part, which passes through the shell in the assembled device and is screwed into the internal thread of the base, and an outer part located outside the base and serving for holding a dental prosthesis. Specifically, it discloses an implant-abutment connection.

United States Patent Application No. 2010/0311013 A1 discloses a screw-receiving abutment for use with an endosseous dental implant, comprising, at its proximal end, an unthreaded cylindrical portion, and, proximal to said unthreaded cylindrical portion, a frustoconical portion with an unthreaded external surface and a retentive groove for engaging a transfer component or a comfort cap, and a distal, partly-threaded shank of a size and shape appropriate to engage internal threads of an implant. It is evident that the frustoconical connection of this reference includes a horizontal and circumferential groove in the lower half of the frustoconical connection for retention.

United States Patent Application No. 2001/0044095 A1 discloses using a plurality of parts that act as "shock absorbers" or "crush washers" that allow a dynamic relationship between the dental implant and the prosthetic component.

United States Patent Application No. 2010/0311012 A1 describes an elastic/dynamic abutment or fixture system for mounting abutments to dental implants. It also describes a flat connection between multi-unit abutments.

U.S. Pat. No. 8,277,218 B2 discloses a dental implant consisting of an auger-like lower threaded portion that is screwed into the bone. It includes a divergent intermediate collar with mini-threads for engaging the cortical bone, and a tapered abutment for fixed tooth replacement or a ball-like snap attachment to secure removable dentures.

U.S. Pat. No. 7,785,107 B2 discloses a tool or fixture that is mounted on a dental implant that assists the dentist/implantologist in placement of the implant in the patient's jaw bone and then can be used for other functions related to that implant.

United States Patent Application No. 2014/0272792 A1 discloses a conversion abutment that is configured to be secured onto the head of a dental implant with the head of the dental implant inserted into a recess of the conversion abutment. It further includes an extending coronal outcropping to which a coping can be attached. Coping includes a recess formed therein for receiving the coronal outcropping of the conversion abutment, and is fastened to the conversion abutment using a fastener element that extends from the coping into the coronal outcropping. As is evident, this reference provides an abutment that cements over a one-piece dental implant to increase prosthetic options for that one-piece dental implant system. Specifically, one-piece implant systems are not indicated for implant-supported full arch prosthesis due to lack of prosthetic flexibility as well as vertical dimension constraints during surgical placement of the implant body.

U.S. Pat. Nos. 6,030,219 and 6,299,447 disclose a dental attachment assembly that has an abutment member for attachment to a tooth root, implant, or adjacent tooth, and a male member for hinged engagement in a cap secured in a dental appliance. The male and abutment members are designed for releasable snap engagement to secure the members together. A skirt projects from the upper end of the male retention member and engages an outer locating surface of the abutment member as the members are secured together, acting to align the male member with the abutment members.

United States Patent Application No. 20120077151 A1 discloses a Morse taper dental implant that uses Morse taper to mate a part such as an abutment, to the implant (i.e. for implant-abutment connection). It does not disclose use of Morse taper between different connection parts that connect prosthesis to the abutment (i.e., for abutment-prosthesis connection).

As a general rule dental implants require 3-6 months to heal in the lower jaw and 4-6 months in the upper jaw. Often bone grafting is needed before the implant placement surgery can even begin. Therefore, this adds extra time for the healing to take place. Usually, the patient is provided with some sort of removable teeth to wear during the healing period and until the prosthesis is ready. However, during this period (which can last for up to six months), when the patient is new to the use of a dental prosthesis, it would be much more comfortable to have a fixed denture than a temporary conventional denture. This would prevent the embarrassing inconveniences of a denture dropping loose and perhaps not being able to smile naturally or any of the disadvantages previously mentioned with removable dentures. However, various studies have shown that when given the experience of both a fixed and removable implant prosthesis, patients prefer to have a removable prosthesis as they provide significantly better ability to speak and ease of cleaning.

However, none of the known prosthesis to implant connections provide a system that can enable a patient to have a fixed dental prosthesis during the period of healing of the implant and a removable dental prosthesis after the healing process. It would be further advantageous if a same dental implant abutment could be used as a fixed prosthesis during healing period and converted to a removable prosthesis after the healing.

SUMMARY

There is a need for an improved, convertible dental assembly that could be used as a fixed prosthesis during a healing period, and converted to a removable prosthesis after the healing period.

A novel convertible dental assembly is provided to overcome the limitations of conventional prosthesis. In an aspect, the disclosed convertible dental assembly includes a prosthesis-to-implant connection that can enable a patient to have a fixed dental prosthesis (also referred to as fixed-hybrid dental prosthesis or fixed-hybrid prosthesis or simply fixed hybrid and these terms are used interchangeably hereinafter) during the period of healing of the implants, and a removable dental prosthesis (also referred to as removable-hybrid dental prosthesis or removable-hybrid prosthesis or simply removable hybrid and these terms are used interchangeably hereinafter) after the healing process, using the same dental implant abutment. Advantageously, by not exchanging the abutment between fixed and removable dentures, the soft tissues will not be disturbed by breaking the hemidesmosomal attachment of the gingiva to the abutment surface.

According to an embodiment, the disclosed convertible dental assembly includes an abutment, a first housing for fixed prosthesis, a second housing for removable prosthesis and other parts for fixing the respective housing to the abutment.

In an aspect, the abutment and the first and the second housing include conical profiles that engage with each other to enable locating and holding of the housings with the abutment. The abutment includes an external frustoconical profile, and the housings include a cavity with an internal frustoconical profile. The external profile on the abutment and the internal profile on the housings engage with each other to help locate and retain the convertible dental assembly in position and take the force of biting and mastication. The engagement conical profiles also ensure that the dental assembly does not move either toward the gums or laterally.

According to an embodiment, the housing for the fixed prosthesis is captured in a denture via chair-side pickup and left in the denture/prosthesis during the period of healing, and is fixed to the abutment through a screw. During the pickup a transition screw with a taller head is used to prevent pickup material from blocking passage of the fixing screw. Once the material has set, the transition screw is removed and replaced with a regular screw after removal of excess material.

According to an embodiment, the housing for fixed prosthesis is adapted to enable its replacement by the housing for removable prosthesis, which is also captured in the denture via chair-side pickup and left in the denture/prosthesis after the period of healing. This enables the same denture assembly to be used as a removable prosthesis. Female threads in the abutment that are used for holding the screw for the fixed prosthesis can also be used for holding a male attachment of a "snap fit" part for the removable prosthesis. The snap fit part for the removable prosthesis includes a plastic insert that snaps in to a concave cavity in the housing for the removable prosthesis. The concave cavity is an extension of the conical cavity as located beyond the conical cavity. Thus, while the outer conical profile on the abutment and the internal conical profile on the housing engage to prevent lateral and vertical movement, snapping of the insert in the concave cavity prevents the removable prosthesis from getting dislodged from its position during mastication, speech, and other movements of the head, neck, and mouth.

In an aspect, a prosthesis-to-abutment connection is disclosed that is based on engagement of frustoconical surfaces on a mating part. The mating frustoconical surfaces are provided on an abutment that is fixed to the implant, and a housing that is captured in the denture. The disclosed prosthesis to abutment connection further includes a fixing screw when the prosthesis to abutment connection is used for fixed dental prosthesis, and a snap fitting part and a concave cavity when the prosthesis to abutment connection is used for removable dental prosthesis.

According to an embodiment, the mating frustoconical surfaces can be an outer surface on the abutment and an internal surface of a cavity in the housing. The mating frustoconical surfaces can have a taper ranging from about 10 degrees to about 25 degrees that frictionally hold the mating parts.

According to an embodiment, the internal threads provided on the abutment for fixing the screw that is used in fixed dental prosthesis can be used for holding the snap fit part in case of removable dental prosthesis.

According to an embodiment, the disclosed prosthesis-to-abutment connection can be used for a convertible dental assembly wherein using the disclosed prosthesis-to-abutment connection, the same denture can be used as a fixed hybrid prosthesis during the healing of the implant, and thereafter, converted to a removable hybrid prosthesis by replacing the housing in the denture and fixing the snap fit part in place of the fixing screw.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
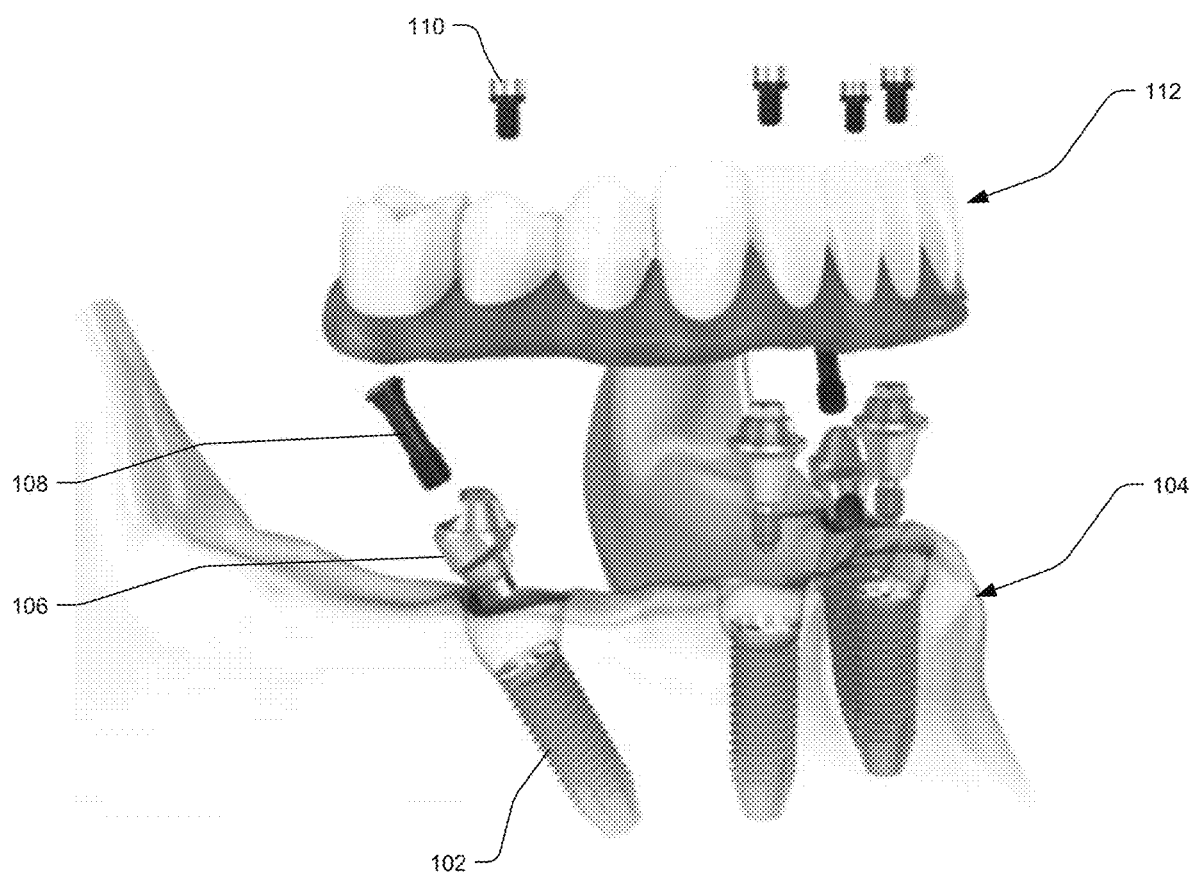
FIG. 1 illustrates a typical fixed-hybrid dental prosthesis attached to edentulous mandible through implants.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms are used herein. To the extent a term used in a claim is not defined, it should be given the broadest definition persons in the pertinent art have given that term as reflected in printed publications and issued patents at the time of filing.

The term 'immediate load hybrid denture' as used herein refers to the teeth a patient can get when he gets a so-called "teeth in a day" procedure.

The term 'screw retained' as used herein refers to a dental prosthesis that is fixed in the patient's mouth with screws and is not removable by the patient.

The term 'denture' as used herein refers to a generic term for a full-arch prosthesis that is one piece and can be made from a variety of materials. It can be fixed or removable.

The term 'full-arch' as used herein refers to all the teeth on the upper or lower jaw. It does not refer to both jaws.

The term 'edentulous' as used herein refers to being partially or completely without teeth. It can refer to the whole mouth or just an arch (upper or lower).

The term 'restoration' as used herein refers to any rehabilitation of tooth structure(s) that have been lost by cavities, gum disease, trauma, or congenitally missing.

The term 'implant retained' as used herein refers to a dental prosthesis that uses implants to prevent the denture from coming out of the patient's mouth. The denture still rests on the patient's gums when biting and chewing on food.

The term 'implant supported' as used herein refers to a dental prosthesis that is completely supported by the implants and the force of biting and chewing is not on the gums.

The term 'overdenture' as used herein refers to a removable denture that is retained or supported by one or more dental implants.

The term 'chair-side pickup' or 'pickup' as used herein refers to a technique or process that uses direct/cold cure materials for capturing and fixing a housing at its desired position in a denture while the patient is in a chair at the dentist's office.

Conventionally, a patient who goes for full arch restoration with hybrid dental prosthesis, after he has undergone surgery for implants, is provided with some sort of removable teeth to wear during the healing period till the implants have successfully osseointegrated and until the prosthesis is ready. Temporary denture provided during this period is removable and causes inconvenience to user who is new to wearing a dental prosthesis.

It is an objective of the present disclosure to provide an immediate load hybrid denture while healing so that patient who is new to wearing dental prosthesis is not inconvenienced by the temporary denture dropping loose and the wearer not being able to smile, chew, or speak naturally.

Another objective of the present disclosure is to convert the immediate load hybrid denture that is provided to patient during healing period, to a removable hybrid denture which, in long run, is preferred by patients as it provides significantly better ability to speak and ease of cleaning.

Yet another objective of the present disclosure is to provide the patient with the benefits of a removable-hybrid denture. An advantage of a removable-hybrid denture, as well as all removable dentures, is simplicity of hygiene and maintenance. The patient or caregiver needs only to remove the prosthesis and under running water wash and lightly brush the denture before placing the denture back in the patient's mouth. A fixed-hybrid denture will get food lodged under the prosthesis which, in most cases, can only be removed using a device designed to blast pressurized water under the prosthesis. Currently, this device is for at home use and is not portable. Therefore, a further objective of the present disclosure is to provide a removable-hybrid denture that can be cleaned anywhere, not just at home or in the dentist's office.

Figure 2:
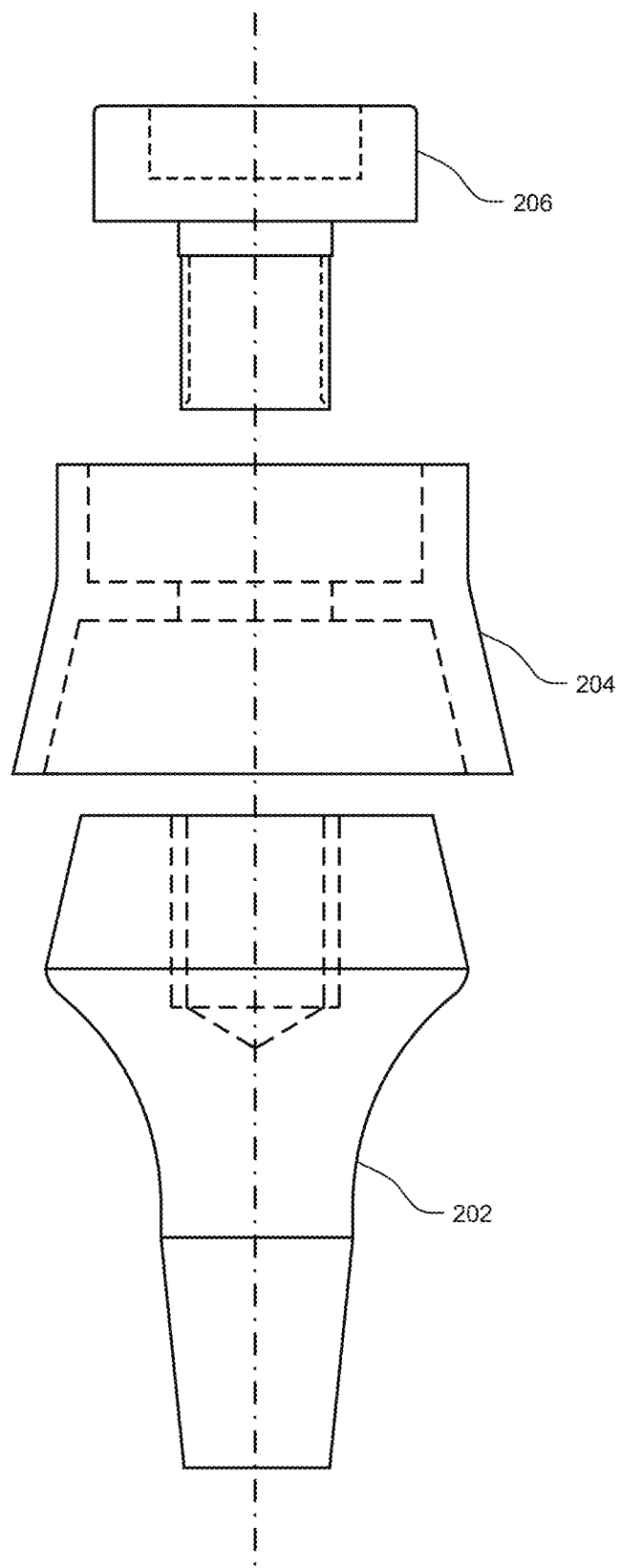
FIG. 2 illustrates an exemplary exploded view of connecting parts for fixed-hybrid prosthesis in accordance with an embodiment.
Figure 3B:
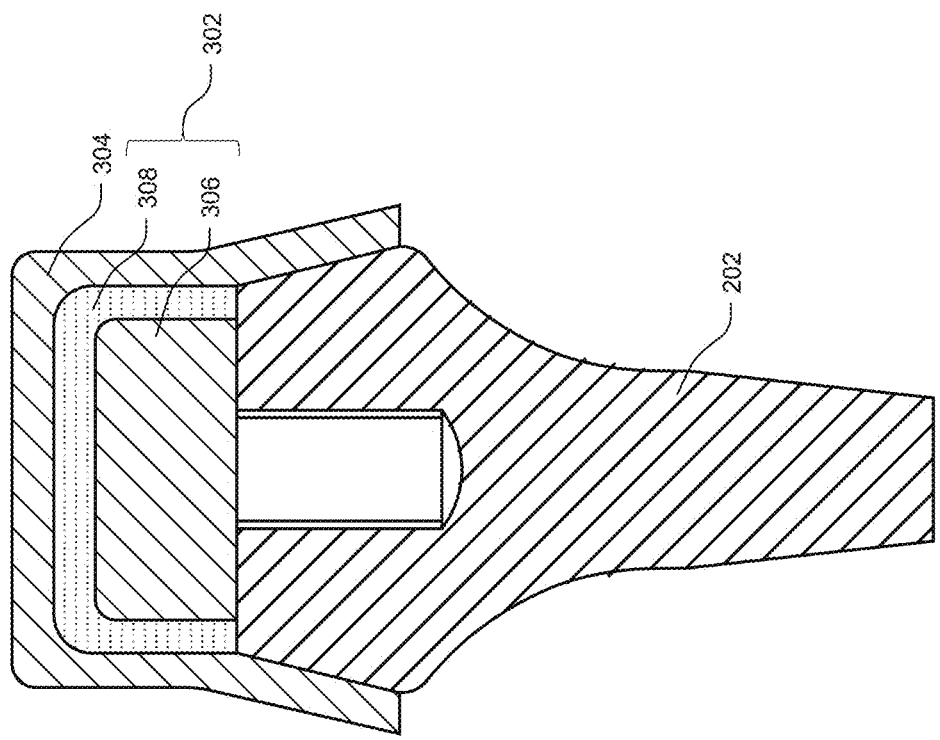
FIGS. 3A and 3B illustrate exemplary exploded view and sectional view respectively showing details connecting parts for removable-hybrid prosthesis in accordance with an embodiment.
Figure 3A:
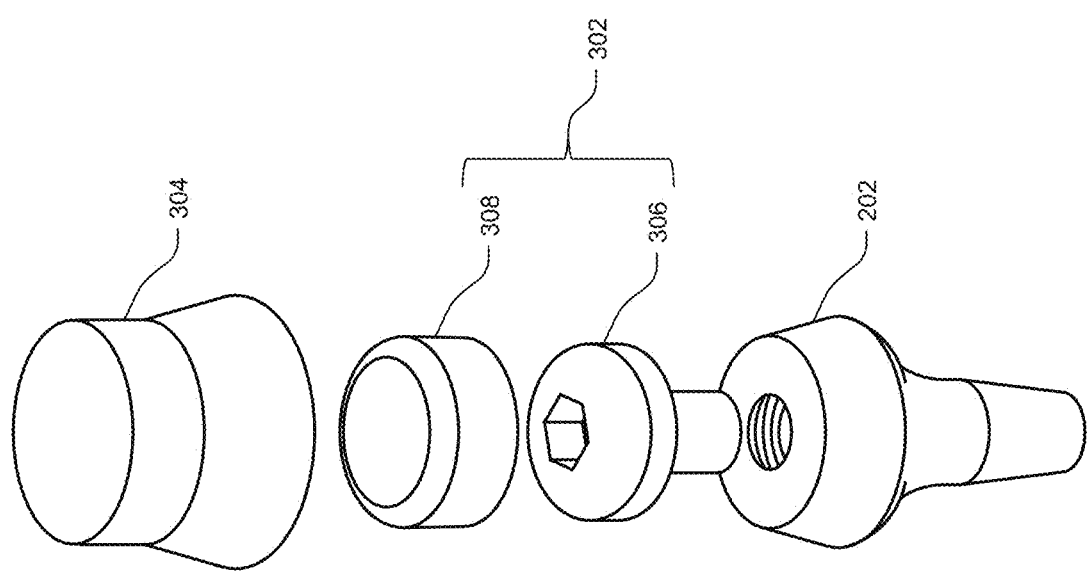

FIGS. 2 and 3A illustrate exploded views of connecting parts for a denture to implant connection for an exemplary fixed configuration and a removable configuration respectively of the proposed convertible dental assembly. Connecting parts for the fixed configuration of the convertible dental assembly (refer to FIG. 2) include an abutment 202, a housing for fixed-hybrid 204 (also referred to as fixed-hybrid housing 204) and a fixing screw 206. Connecting parts for removable configuration of the convertible dental assembly (refer to FIG. 3A) include the abutment 202, a housing for removable hybrid 304 (also referred to as removable hybrid housing 304) and a snap fit part 302 that comprises a male attachment 306 and a retention insert 308. FIG. 3B illustrates a sectional view showing the interrelationship between the connecting parts for the removable configuration of the convertible dental assembly after assembly.

According to an embodiment, abutment 202 can remain the same for both fixed hybrid and removable hybrid and can be fixed to an implant by any of the known methods of attachment without limitation to the concepts of the present disclosure.

Figure 4A:
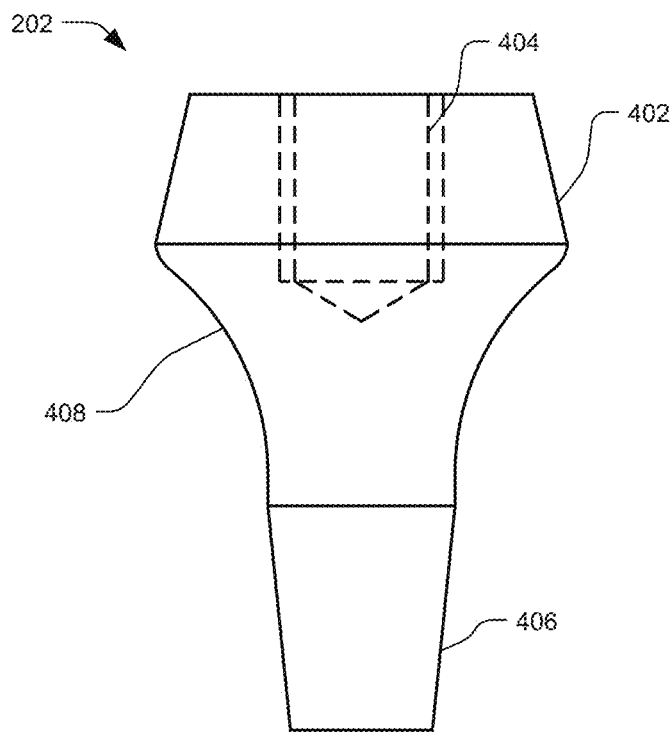
FIGS. 4A and 4B illustrate exemplary views of abutments of two different configurations in accordance with an embodiment.

FIG. 4A illustrates an exemplary side view of abutment 202 in accordance with an embodiment. Lower part 406 of the abutment 202 pertains to abutment-implant connection, and as stated earlier, features of this portion of the abutment 202 can depend on a method used to fix the abutment 202 to a corresponding implant. Beyond the lower part 406, lies a concave portion 408 of varying height and radius depending on the distance from the gingiva of the patient to the platform of the implant.

In an aspect, the abutment 202 includes an external conical/frustoconical surface 402 that engages with an internal surface of like profile in the housings—both for fixed-hybrid housing 204, and removable-hybrid housing 304 (refer FIGS. 2, 3A and 3B). The feature of engagement through frustoconical surfaces takes the force of biting and mastication. This ensures that the denture/prosthesis does not move either toward the gums or laterally.

According to an embodiment, the abutment 202 can further include a flat platform with female threads 404. The flat platform with female threads 404 allows the abutment 202 to be used for fixed hybrid or for removable hybrid procedures by connecting the prosthesis with the abutment 202 through a fixing screw 206 (refer FIG. 2) or through a snap fit part 302 (refer FIGS. 3A and 3B) respectively. In particular and advantageously, initially the disclosed convertible dental assembly can be screw-retained and then later converted to a removable-hybrid by replacing the fixing screw by the snap fit part 302 and change of housing in the denture as described subsequently.

Figure 4B:
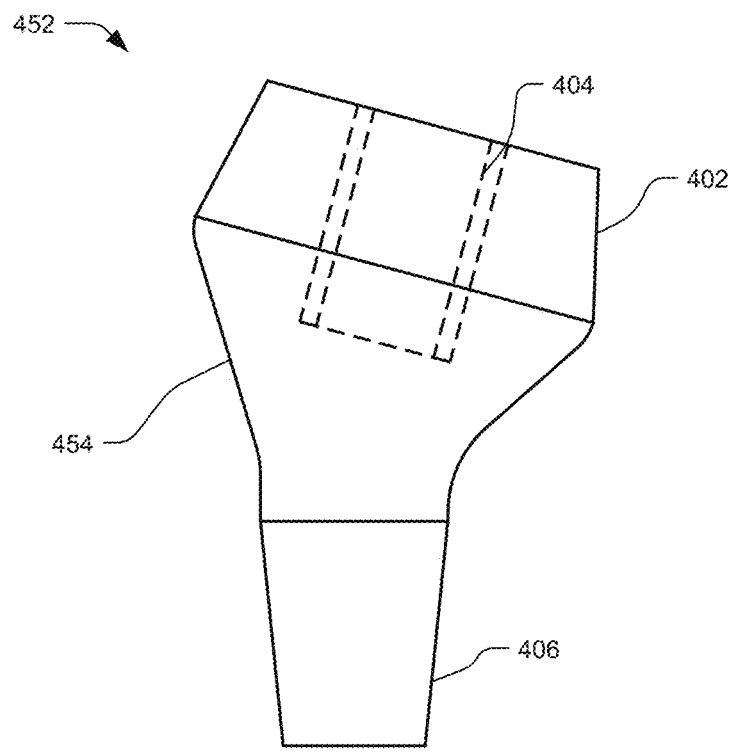

According to an embodiment, abutment 202 can be in different configurations to meet specific requirements. For example, there can be an angled abutment 452 as shown in FIG. 4B. Besides abutments 202/452, there can be abutments with concave portion 408/454 of varying height and radius depending on the distance from gingiva of patient to platform of the implant as stated earlier. Thus, suitable abutments 202 can be selected based on angularity of the implants and the height of the soft tissue around the implant.

Figure 5A:
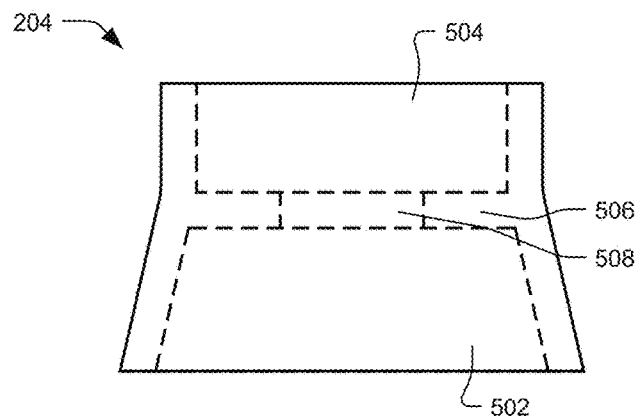
FIGS. 5A-5C illustrate different views of housing for fixed-hybrid prosthesis in accordance with an embodiment.
Figure 5B:
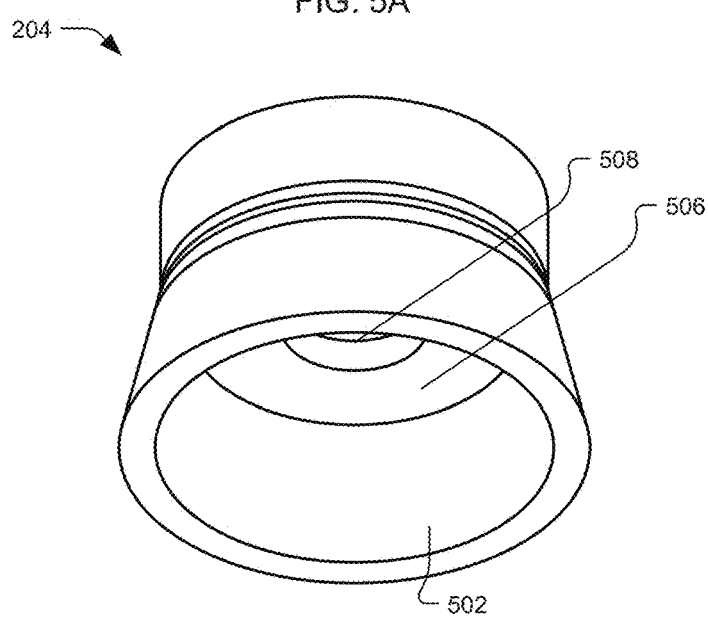
Figure 5C:
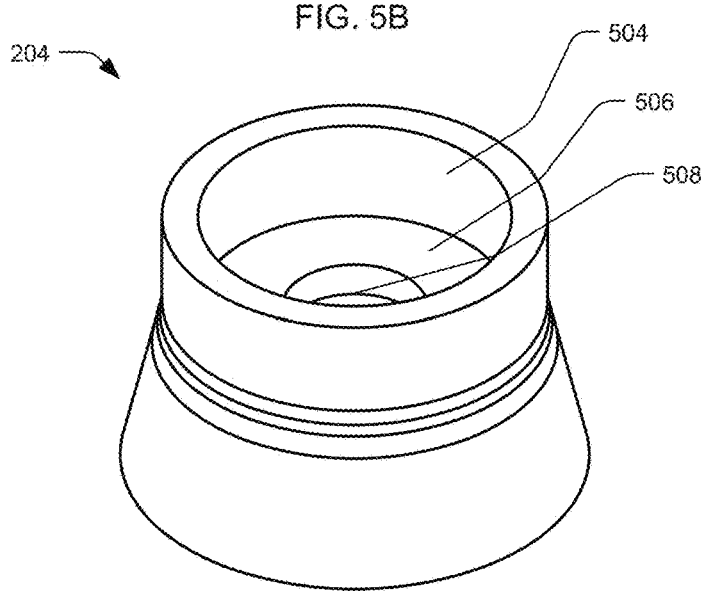

FIGS. 5A to 5C illustrate different views of housing 204 for fixed-hybrid prosthesis in accordance with an embodiment. The fixed-hybrid housing 204 incorporates, towards its abutment end, a cavity 502 with frustoconical inner surface that matches corresponding frustoconical outer surface 402 of abutment 202. According to an embodiment, the opposite end of the fixed-hybrid housing 204 incorporates a cylindrical cavity 504 to provide a recessed site for the head of the fixing screw 206 to sit into. The cylindrical cavity 504 results in parallel walls that take up a volume in the denture and help in planning for the final, removable, prosthesis.

According to an embodiment, cavity 502 with frustoconical inner surface and cylindrical cavity 504 can be separated by a partition 506 that incorporates a hole 508 for fixing screw 206 or a temporary screw to pass through for engagement with abutment 202 while head of the fixing screw 206 or a temporary screw 652 to sit in the cylindrical cavity 504.

According to an embodiment, the fixed-hybrid housing 204 can be captured and fixed in the denture by the process of chair-side pickup and left in the denture/prosthesis. Thereafter, the fixed hybrid prosthesis can be fixed to abutments through fixing screws 206.

According to an embodiment, during the process of chair-side pickup, a transition screw with a taller head can be used to prevent the pickup material from engaging undercuts or blocking passage of the fixing screw 206. Once the material has set, the transition screw can be removed and replaced with the fixing screw 206 after removal of excess material and polishing of the denture.

Figure 6A:
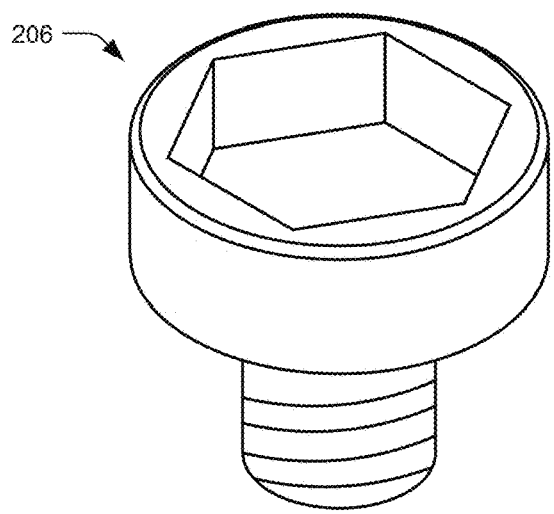
FIGS. 6A and 6B illustrate perspective views of fixing screw and transition fixing screw respectively for fixed-hybrid prosthesis in accordance with an embodiment.
Figure 6B:
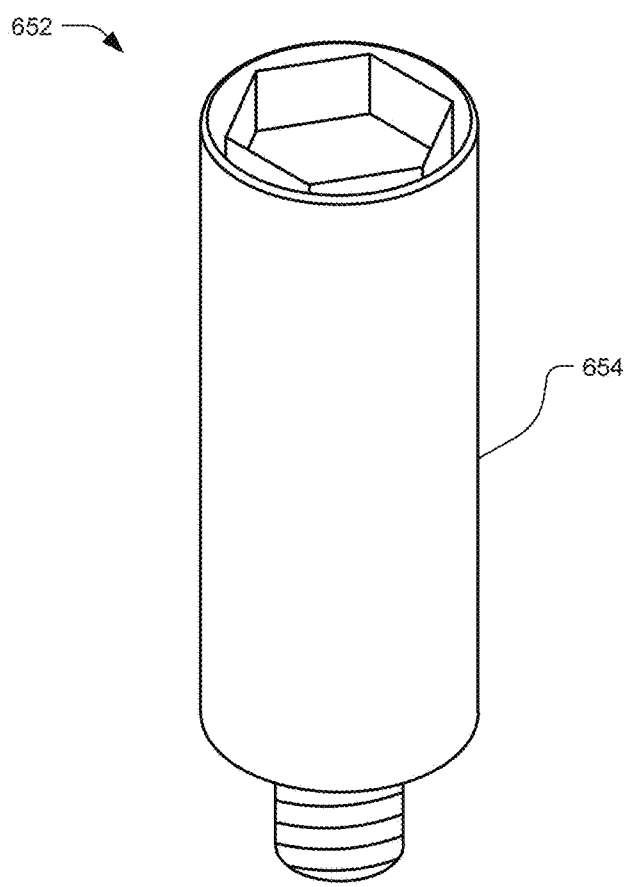

FIGS. 6A and 6B illustrate perspective views of fixing screw 206 and transition fixing screw 652 respectively for fixed-hybrid prosthesis in accordance with an embodiment. As shown the transition fixing screw 652 incorporates a taller head 654 as compared to the head of the fixing screw 206 to prevent pickup material from engaging the undercuts.

Figure 7A:
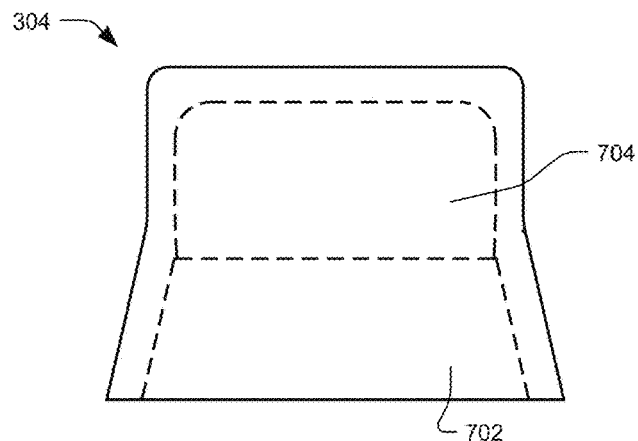
FIGS. 7A-7C illustrate different views of housing for removable-hybrid prosthesis in accordance with an embodiment.
Figure 7B:
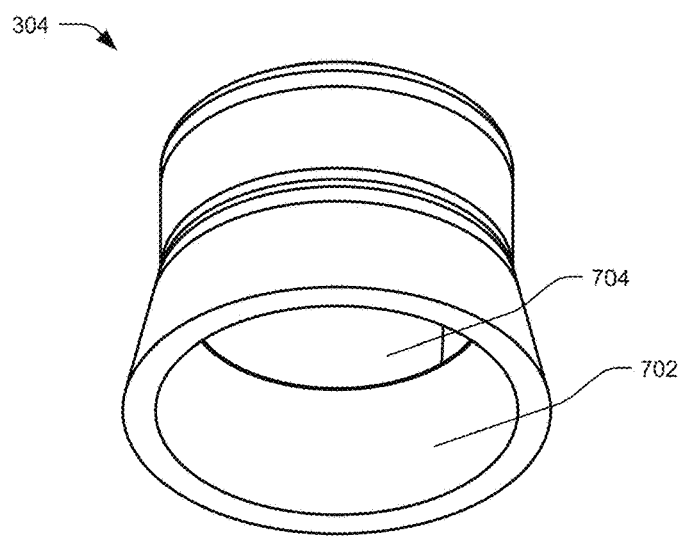
Figure 7C:
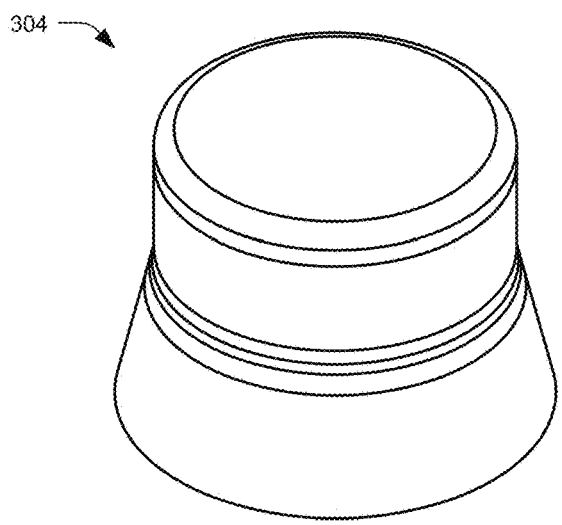

FIGS. 7A-7C illustrate different views of the housing 304 for removable-hybrid prosthesis in accordance with an embodiment. Similar to the fixed-hybrid housing 204, the removable-hybrid housing 304 incorporates, towards its abutment end, a cavity 702 with frustoconical inner surface that matches corresponding frustoconical outer surface 402 of abutment 202. In continuation of the frustoconical cavity 702, the removable-hybrid housing 304 includes a retention insert cavity 704. This cavity retains retention insert 308 (refer to FIGS. 3A and 3B) in the deep inner portion of the removable-hybrid housing 304.

According to an embodiment, the walls of retention insert cavity 704 are made concave giving a barrel shape to the retention insert cavity 704 that helps in retaining the retention insert 308 in the retention insert cavity 704. According to an embodiment, the retention insert 308 can be of a polymer material and have a shape that matches shape of the retention insert cavity 704 so that the retention insert 308 snaps into undercut in the retention insert cavity 704, and offers resistance to removal.

In an aspect, the taper on each of frustoconical inner surface of cavity 502 and 702 of fixed-hybrid housing 204 and removable-hybrid housing 304 respectively on one hand, and frustoconical outer surface 402 of the abutment 202 can range from about 10 degrees to 25 degrees for a firm frictional engagement between the housing 204/304 and the abutment 202. In certain aspects, the taper can be about 13 degrees. However, it is understood that this value can change based on the type of implant and/or the patient phenotype with respect to gingiva and skeletal form. In particular, the taper on mating parts of the abutment to denture connection of the removable-hybrid can add to the retention force of retention insert 308, and can ensure better gripping force in longitudinal direction, thus preventing accidental dislodging of the prosthesis from its position.

According to an embodiment, the removable-hybrid housing 304 can be captured and fixed in the denture by process of chair-side pickup and left in the denture/prosthesis captured via chair-side pickup in the same fashion as the fixed housing. However, no transition screw is required during the pickup. Alternatively, the removable-hybrid housing 304 can be processed indirectly in a dental laboratory if a new denture is being fabricated.

According to an embodiment, male attachment 306 can be fixed to abutment 202 through female threads 404 as shown in FIG. 3B and remain there to provide vertical retention be engaging the retention insert 308 with removable-hybrid housing 304.

In implementation, the disclosed convertible dental assembly can be used for treatment of an edentulous arch. After the dental implants have been placed, the first step is to identify abutment 202/252 to be used based on angulation of the implants and height of the soft tissue around the implant. Once the abutments have been selected, the abutments can be placed so that parallelism is achieved across the arch within about 12 degrees total variance.

With the abutment placed and properly aligned, the preparation of the denture to a fixed-hybrid can be done. A fixed-hybrid housing 204 can be placed on each abutment 202/252 and secured with transition screws 652. An acceptable amount of material can be removed from the denture in the areas of the housings 204 to allow passive fit in correct positions. Using a 2-part chemical cure, injectable acrylic can pick-up the housings 204 directly in patient's mouth. Once cured, the prosthesis can be removed, trimmed of extra material and polished. The prosthesis can be put back on the abutments 202/252 and fixed to the abutment 202/252 using the fixing screws 206.

After the implants have become well integrated, the fixed-hybrid can be converted to a removable-hybrid denture. For this, a new denture can be fabricated. The new denture can be made completely in-lab or a chair-side pick-up can be arranged. Either way, the existing abutment is left in place and snap fit parts 302 can be fixed to abutments 202/252 through female threads 404 in the abutments 202/252, and removable-hybrid housings 304 used for the new denture. At delivery, the new denture fit and function is confirmed with the usual methods.

Thus the disclosed convertible dental assembly combines the best features of two different treatment options. It provides feature of small size of a fixed-hybrid prosthesis and the removable feature of a conventional overdenture. The removable-hybrid housings can be placed indirectly by a dental laboratory if a new denture is being fabricated. Thus, the size of the final prosthesis is much smaller and accordingly more comfortable for a patient.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Furthermore, the particular illustrative embodiments disclosed above may be altered or modified and all such variations are considered within the scope and spirit of the present invention. While convertible dental assembly and methods are described in terms of "comprising," "containing," or "including" various devices/components or steps, it is understood that the systems and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values.

The invention claimed is:

1. A convertible dental assembly comprising:
   one or more abutments adapted for fixing with one or more dental implants;
   a fixed-hybrid dental assembly, comprising:
     one or more fixed-hybrid housings; and
     a fixing screw, wherein each fixed-hybrid housing is adapted for affixing with a corresponding abutment out of the one or more abutments through the fixing screw; and
   a removable-hybrid dental assembly, comprising:
     one or more removable-hybrid housings; and
     a snap fit part, the snap fit part comprising:
       a male attachment; and
       a retention insert, wherein the retention insert is in engagement with the removable-hybrid housing, wherein each removable-hybrid housing is adapted for engagement with a corresponding abutment out of the one or more abutments through the snap fit part,
   wherein each of the abutments further comprise a female thread, and
   wherein the fixing screw and the male attachment of the snap fit part are affixed to one of the abutments through a same female thread.

2. The convertible dental assembly according to claim 1, wherein the one or more fixed-hybrid housings are configured for use for a fixed-hybrid dental assembly during a period involving healing of the dental implants, and wherein the one or more fixed-hybrid housings are configured to be replaced by the one or more removable-hybrid housings along with the snap fit part for a removable-hybrid dental assembly after the period of healing of the dental implants.

3. The convertible dental assembly according to claim 2, wherein the one or more fixed-hybrid housings and the one or more removable-hybrid housings are captured via a chair-side pickup at respective instances.

4. The convertible dental assembly according to claim 3, further comprising a transition fixing screw, wherein the transition fixing screw incorporates a taller head as compared to a head of the fixing screw to prevent pickup material from blocking passage of the fixing screw.

5. The convertible dental assembly according to claim 4, wherein the transition fixing screw is used during capturing of the plurality of fixed-hybrid housings via chair-side pickup.

6. The convertible dental assembly according to claim 1, wherein the abutment includes a frustoconical outer profile for engagement with a cavity of matching frustoconical shape in the fixed-hybrid housing and the removable-hybrid housing.

7. The convertible dental assembly according to claim 6, wherein the fixed-hybrid housing further includes a cylindrical cavity on an end opposite the end with the cavity with frustoconical shape, and wherein the cylindrical cavity provides a recessed site to accommodate the head of the fixing screw.

8. The convertible dental assembly according to claim 6, wherein the removable-hybrid housing further includes a retention insert cavity in continuation of the cavity with frustoconical shape, and wherein the retention insert cavity retains the retention insert of the snap fit part.

9. The convertible dental assembly according to claim 8, wherein the retention insert cavity is concave shaped to provide a snap fit to the retention insert of the snap fit part.

10. The convertible dental assembly according to claim 9, wherein the retention insert comprises a polymer for enabling snapping of the retention insert in the concave retention insert cavity.

* * * * *